Figure 1:
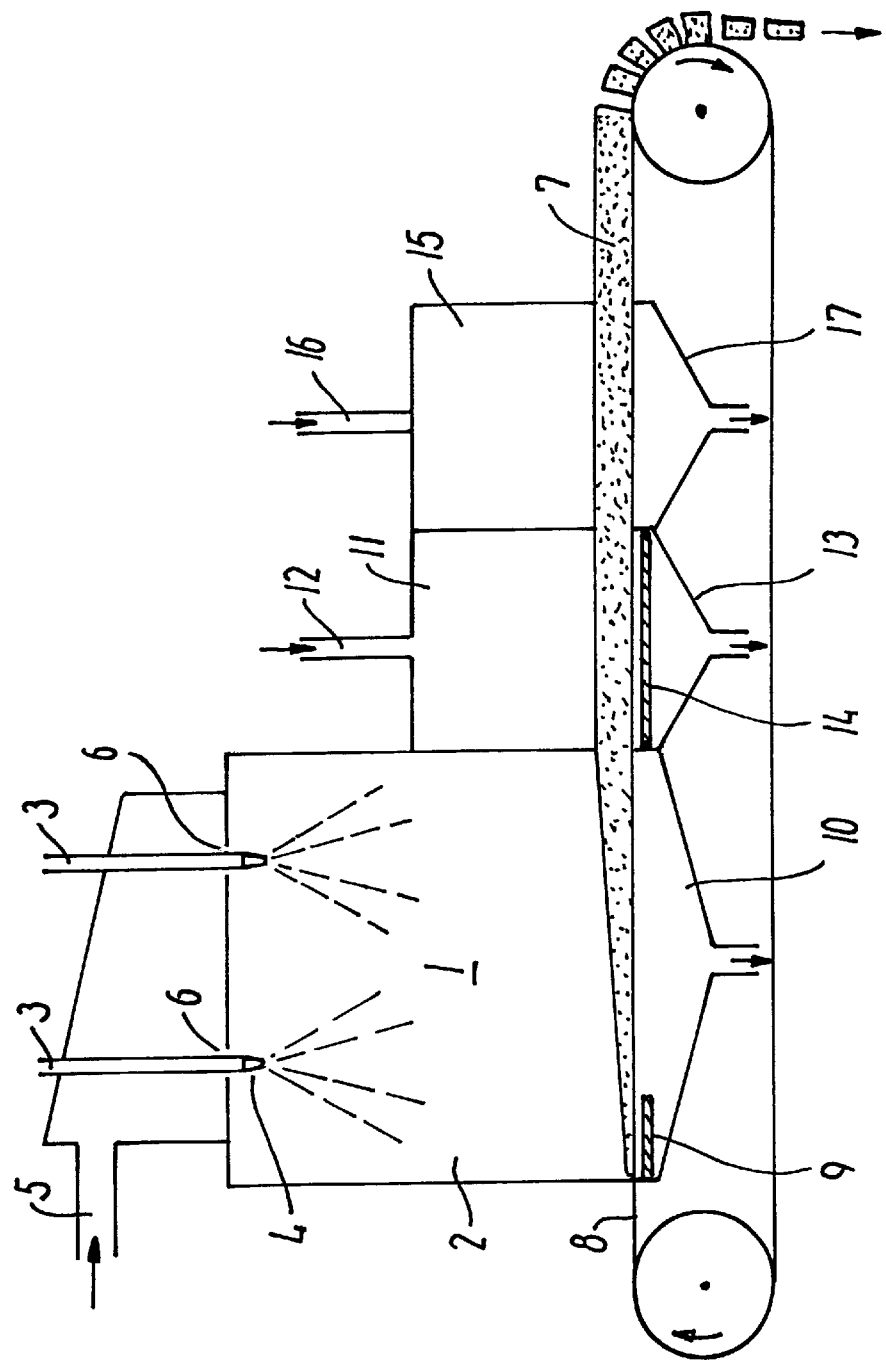

United States Patent [19]
Petersen

[11] Patent Number: 6,151,798
[45] Date of Patent: Nov. 28, 2000

[54] PROCESS AND APPARATUS FOR SPRAY DRYING OR SPRAY COOLING

[75] Inventor: Torsten Strand Petersen, Greve, Denmark

[73] Assignee: Niro A/S, Soborg, Denmark

[21] Appl. No.: 09/254,200

[22] PCT Filed: Sep. 1, 1997

[86] PCT No.: PCT/DK97/00356

§ 371 Date: May 4, 1999

§ 102(e) Date: May 4, 1999

[87] PCT Pub. No.: WO98/09700

PCT Pub. Date: Mar. 12, 1998

[51] Int. Cl.[7] .................................................. F26B 5/06
[52] U.S. Cl. .......................... 34/304; 34/367; 34/373; 34/394; 34/430; 34/218; 34/227
[58] Field of Search ............................. 34/302, 304, 362, 34/366, 367, 372, 373, 391, 393, 394, 430, 90, 181, 218, 227, 216, 217, 208, 203, 236

[56] References Cited

U.S. PATENT DOCUMENTS

| | | |
|---|---|---|
| Re. 22,090 | 5/1942 | Powell ........................................ 34/394 |
| 3,520,066 | 7/1970 | Meade . |
| 3,525,163 | 8/1970 | Boylan et al. ............................. 34/394 |
| 3,615,723 | 10/1971 | Meade . |
| 3,741,273 | 6/1973 | Meade . |
| 4,116,756 | 9/1978 | Quee .......................................... 34/236 |
| 4,351,849 | 9/1982 | Meade . |
| 4,784,878 | 11/1988 | Haak ........................................ 427/212 |
| 5,595,282 | 1/1997 | Mokler ...................................... 34/216 |

FOREIGN PATENT DOCUMENTS

| | | |
|---|---|---|
| WO 90/02914 | 3/1990 | Denmark ........................... F26B 3/12 |
| 0 446 984 | 9/1991 | European Pat. Off. . |
| WO 89/09372 | 10/1989 | WIPO . |
| WO 90 02914 | 3/1990 | WIPO . |

*Primary Examiner*—Stephen Gravini
*Assistant Examiner*—Andrea M. Joyce
*Attorney, Agent, or Firm*—Sughrue, Mion, Zinn, Macpeak & Seas, PLLC

[57] ABSTRACT

In a process and an apparatus (1) for spray drying or spray cooling of the so-called Filtermat® type, a more uniform product layer (7) is achieved by collecting and/or treating the product on a screen means (8, 14, 19) providing a pressure difference being at least 1.5, preferably from 1.5 to 30 and particularly from about 2 to about 20 times that provided by the product layer, when collected.

44 Claims, 2 Drawing Sheets

PROCESS AND APPARATUS FOR SPRAY DRYING OR SPRAY COOLING

This invention relates to a process and an apparatus for spray drying or spray cooling, particularly for spray drying liquids containing solid materials dissolved and/or suspended therein or for spray cooling congealable liquids.

Apparatuses for spray drying or spray cooling comprising a spray drying or spray cooling chamber, means for atomizing a feed stream into said spray drying or spray cooling chamber, means for bringing a drying or cooling gas into contact with said atomized feed stream in said chamber so as to provide partially dried or congealed particles, a screen means having a movable surface for collecting said partially dried or congealed particles so as to form a product layer, means for drawing drying or cooling gas through said product layer and said screen means in one or more drying or cooling stages, a pressure difference thereby being applied over the screen means and the product layer, and means for moving said movable surface are known in the art.

For instance, spray drying apparatuses of this kind and processes for spray drying, which can be carried out in such apparatuses, are known from U.S. Pat. Nos. 3,520,066, 3,615,723, 3,741,273 and 4,351,849, the contents of which are incorporated herein by reference. A commercially used process of this kind is the so-called Filtermat® process.

Also apparatuses and processes, wherein a coating or similar treatment is carried out concurrently with the spray drying by means of bringing the atomized feed stream into contact with an atomized stream of a coating substance, or the like, in the spray drying chamber are known, cf. e.g. U.S. Pat. No. 4,784,878, the contents of which are incorporated herein by reference.

In carrying out a process of the abovementioned kind, the feed stream is atomized using such means as nozzle atomizers (e.g. pressure nozzles or fluid-atomizing nozzles) or rotary atomizers (e.g. atomizer wheels or atomizer discs) and brought into contact with a stream of drying or cooling gas (laminar and/or turbulent) and possibly a coating substance and/or other additive(s), so as to obtain partially dried or congealed particles, which are collected as a product layer of at least partially agglomerated, particles on the movable surface of the screen means, such as a perforated drum, a conveyor belt made from wire screen or a woven filter web, and subjected to further drying and/or cooling by drawing drying or cooling gas through the product layer and the screen means. The further drying or cooling may take place in one or more stages, the first one normally being carried out in connection with the collection of the particles on the screen means in the spray drying or spray cooling chamber, whereby drying or cooling gas is drawn through the product layer and the screen means. By means of the movable surface of the screen means, the collected product layer may be moved out of the spray drying or spray cooling chamber during the drying or cooling, or batchwise after a desired degree of drying or cooling has been obtained. Possible further drying and/or cooling steps may be carried out in further stages inside and/or outside the spray drying or spray cooling chamber, whereby the movable surface of the screen means can be used for moving the product layer from one stage to another.

With the purpose of achieving an improved distribution of the particles in the product layer, particularly with regard to achievement of a layer of adequate structure and even thickness in a direction transversal to the direction of movement of the movable surface, when using large or cylindrical drying chambers, it has been proposed to provide a turbulent zone between the chamber and the conveyor belt, cf. WO-A-89/09372. This solution more or less solves the problem of creating a layer of settled particles with an even thickness in the transverse direction of the conveyor belt, does, however, create other problems as, due to a relatively high gas velocity and because of introduced supplementary process air, the particles settle as a compact layer presenting substantive resistance to gas penetration, resulting in a decreased drying velocity and an increased risk of the layer of collected particles and the supporting movable perforated surface becoming blocked.

In order to solve this problem, in EP 0 432 207 B1, it is suggested to remove a fraction of the drying gas from the lower end of the drying tower and possibly also to introduce a gas in the lower end of the tower at certain locations, with the purpose of controlling the stream of air directed towards the conveyor belt, and thereby form a loose and porous layer with a uniform distribution.

However, despite the above mentioned efforts, variations in the thickness and structure of the settled layer may still occur.

The present invention provides an improvement of the above prior art, which can be adopted independently of the above-mentioned approaches or in combination therewith as, on one hand, it can assist in obtaining a uniform layer of particles and, on the other hand, is capable of reducing the adverse effect of any variation in the thickness and density of the layer on the degree of drying or cooling.

Thus, the invention relates to a process for spray drying or spray cooling, wherein partially dried or congealed particles are collected on a movable surface of a screen means, thereby forming a product layer on said movable surface, which layer is dried or cooled in one or more stages by passing drying or cooling gas through said product layer and said screen means, a pressure difference being applied over the screen means and the product layer, and the movable surface being moved, which process is characterized in the pressure difference over the screen means being such in at least one section of at least one drying or cooling stage of the process, that the ratio between said pressure difference and the pressure difference over the product layer, when collected, is at least 1.5, preferably in the range from 1.5 to 30, and particularly in the range from about 2 to about 20.

The pressure difference over the product layer to be taken into consideration, when calculating the abovementioned ratio, is the pressure difference over said layer, when collected, typically as collected at the end of the spray drying or spray cooling chamber.

As in the prior art, the process according to the invention may be combined with a coating step, or the like, if desired.

In the past, it has generally been attempted to use a screen means providing as low a pressure difference as possible in order to reduce the energy consumption. However, it has now been found that particular advantages can be achieved by using a screen means, providing a substantive pressure difference compared to the pressure difference over the collected product layer, in at least one section of at least one drying or cooling stage of the process.

If a screen means providing a less substantive pressure difference compared to the product layer is used, as in the prior art, there is a considerable risk that the product layer may become over-treated at locations of reduced thickness or density, whereby the treated particles may become damaged in these areas. E.g. over-drying may result in the dried particles becoming miscoloured and/or the taste of a food product becoming impaired. Similarly, there is a considerable risk, that the product layer may become under-treated at locations of increased thickness or density, e.g. resulting in an insufficient drying of the particles. If, on the other hand, the pressure difference over the screen means is substantive compared to the pressure difference over the collected product layer, as is the case in the present invention, the effect of any non-uniformity of the thickness or density of the collected layer will be reduced.

By increasing the pressure difference over the screen means, two advantages may be obtained.

Thus, by increasing the pressure difference over the screen means in the particle collection stage, a more uniform product layer can be obtained. Accordingly, in a preferred embodiment of the invention, the ratio between the pressure difference over the screen means and the pressure difference over the product layer, when collected, is at least 1.5, preferably in the range from 1.5 to 30, and particularly in the range from about 2 to about 20, in the particle collection stage.

Furthermore, by increasing the pressure difference over the screen means in e.g. a drying step, the harmful effect of a possible non-uniformity of the collected product layer can be reduced. Accordingly, in a further preferred embodiment of the invention, the ratio between the pressure difference over the screen means and the pressure difference over the product layer, when collected, is at least 1.5, preferably in the range from 1.5 to 30, and particularly in the range from about 2 to about 20, in a stage being an after-treatment stage carried out outside the particle collection stage.

Usually, as the case may be, some drying or cooling of the collected product layer takes place already in the particle collection stage as a result of the drying or cooling gas passing through the collected layer, which means that the combined advantages of a more uniform product layer and a more uniform treatment can be obtained by increasing the pressure difference over the screen means in the particle collection stage as explained above.

Although the increased pressure difference over the screen means will result in a more uniform structure and thickness of the product layer within a given area, the shape of e.g. the spray drying or spray cooling chamber may be such that it tends to provide an inherent difference in thickness of the product layer from one area to another. Thus, a circular chamber, and particularly a large circular chamber, will tend to provide a product layer being thicker in the central part of a movable surface, located in the bottom of said chamber, than in the border areas of the movable surface. This tendency can be counteracted by adapting the screen means to provide a higher pressure difference in the central part of the movable body than in the border areas. Accordingly, in a preferred embodiment of the invention the pressure difference over the screen means varies across the movable surface in a direction being transversal to the direction of movement of said surface.

It may also be desired, that the pressure difference over the screen means varies across the movable surface in the direction of movement of said surface. E.g. it may be desired that the screen means provides a higher pressure difference in the area, where the collection of the partially dried or congealed particles on the movable surface starts, in order to reduce the amount of gas and/or particles passing through the screen means.

The collected product layer may be moved out of the spray drying or spray cooling chamber during the drying or cooling, or batchwise after a desired degree of drying or cooling has been obtained, the former being preferred in case of large scale installations whereas the latter may be more adequate in case of small scale installations, such as installations for laboratory or test purposes. When moved out of the chamber during the drying or cooling, the movement may be continuous or stepwise.

In preferred embodiments of the invention, the ratio between the pressure difference over the screen means, and the pressure difference over the product layer, is in the range from about 2.5 to about 15, and particularly in the range from about 3 to about 10.

The pressure difference over the screen means can be provided in different ways. E.g. it can mainly be provided by a screen member by appropriate selection of said screen member, such as by using a gas permeable conveyor belt of suitable porosity, or the pressure difference over the screen means can, in part, be provided by a screen member and in part by a restriction member, such as a perforated plate, located in the immediate vicinity of the screen member on the side of the screen member being opposite to the product layer. Alternatively, the pressure difference can mainly be provided by a restriction member. The fact that the restriction member is located in the immediate vicinity of the screen member means, that the restriction of the gas flow provided by the restriction member is transferred to the screen member on an "essentially area-to-area" basis. On the other hand, it does not mean that no other elements, such as supporting elements, may be present between the screen member and the restriction member, as long as the "essentially area-to-area" basis is maintained, and the other elements do not result in an unacceptable building up of product material between the screen member and the restriction member.

Variations in the pressure difference over the screen means may e.g. be obtained by using restriction members providing different restrictions in different areas of the screen means.

If a restriction member is used, it will normally be a stationary, but exchangable member, such as a perforated plate, which may be removed for cleaning or exchanged according to product and process requirements. Furthermore, the restriction member may be adjustable, e.g. by comprising two perforated plates, which may be mutually displaced to adjust the restriction. Various perforations and perforation patterns may be used, such as various patterns of slits, gills, circular holes, rhombic holes etc., just as combinations of different types of holes may be used. Also a lamellar structure or the like can serve as restriction member. In this case, the restriction can be adjusted by adjustment of the angle of the lamellae.

When a restriction member is used, the ratio between the pressure difference over the screen member, and the pressure difference over the restriction member, is usually in the range from about 0.025 to about 2.

The screen member can e.g. be a gas permeable conveyor belt, such as a conveyor belt made from wire screen or a woven filter web, such as the double layer woven fabric described in U.S. Pat. No. 4,116,756, the contents of which are incorporated herein by reference. A presently preferred material for such belts is a polyester material. The belt may be tailored to provide different pressure differences in different areas by modification of the web structure. A further material, which can be useful for the screen member/means is a sintered porous material, such as a sintered porous metal, ceramic, and/or polymer material. Also a perforated drum can serve as screen member/means in connection with the invention.

The invention also provides an apparatus for spray drying or spray cooling comprising a spray drying or spray cooling chamber, means for atomizing a feed stream into said spray drying or spray cooling chamber, means for bringing a drying or cooling gas into contact with said atomized feed stream in said chamber so as to provide partially dried or congealed particles, a screen means having a movable surface for collecting said partially dried or congealed particles so as to form a product layer, means for drawing drying or cooling gas through said product layer and said screen means in one or more drying or cooling stages, a pressure difference thereby being applied over the screen means and the product layer, and means for moving said movable surface, which apparatus is characterized in that the screen means is adapted to provide a pressure difference being such in at least one section of at least one of said one or more drying or cooling stages, that the ratio between said pressure difference and the pressure difference over the product layer, when collected, is at least 1.5, preferably in the range from 1.5 to 30, and particularly in the range from about 2 to about 20.

In the present context, and in particular in relation to the definition of the invention, the expression "drawn" should be understood as comprising any transport of the gas through the product layer and the screen means as a result of a higher pressure on the product layer side of the screen means and the product layer than on the opposite side of the screen means, e.g. as obtained by suction from the opposite side of the screen means.

The processes and the apparatuses according to the invention are particularly suitable for drying of sticky, hygroscopic, thermoplastic, heat sensitive, or slowly crystallizing products into free-flowing agglomerated powders and for cooling of liquids presenting similar problems by congealing. E.g. the process and the apparatus according to the invention may be used for drying or cooling of food products, chemicals, pharmaceuticals, detergents or auxiliary products. For further non-limiting examples of products, which can be treated using the process and the apparatus according to the invention, particular reference is made to the aforementioned U.S. Pat. No. 4,351,849, the contents of which are incorporated herein by reference.

In the following, the principle of the invention will be further explained with reference to the accompanying drawings, with particular reference to spray drying, however, it should be understood that the principle will be equally applicable to spray cooling.

In the drawings

Figure 2:
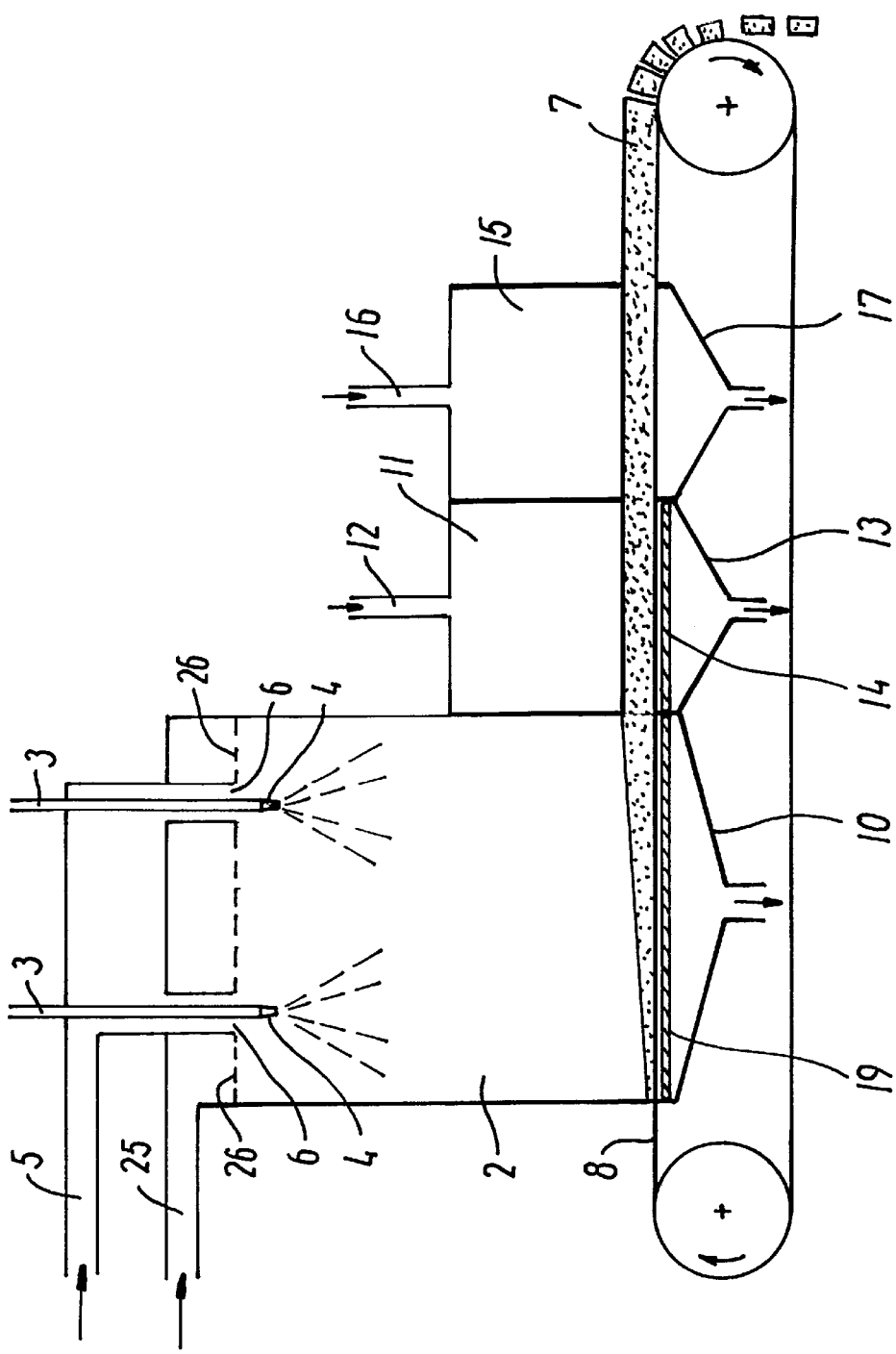

FIG. 1 is a very schematic sectional elevation of a spray drying apparatus of the Filtermat® type, embodying the principle of the invention, and FIG. 2 is a similar illustration of a similar spray drying apparatus, using a different screen means construction.

Referring to FIG. 1, a spray drying apparatus indicated generally by 1 is shown, which comprises a spray drying chamber 2, into which a feed stream supplied through conduits 3 is atomized through pressure nozzles 4, and brought into contact with a drying gas supplied to the drying chamber through a conduit 5 and annular openings 6 surrounding conduits 3. By the contact with the drying gas, the atomized feed stream is converted into sticky, partially dried particles, which are collected as a layer 7 on the surface of a moving belt 8, forming the bottom of chamber 2, by suction through a plenum 10.

By the suction, a pressure difference over the belt of about 20 mm H$_2$O and a pressure difference over the collected layer, leaving the chamber, of about 10 mm H$_2$O is established. Thus, the ratio between the pressure difference over the screen means and the pressure difference over the product layer is about 2.0 in the spray drying chamber 2.

Below the moving belt 8, at the place where it enters chamber 2, and in the immediate vicinity thereof, a perforated plate 9 is provided, which further increases the pressure difference over the assembly of the moving belt 8 and the perforated plate 9 so as to reduce the amount of gas and/or particles passing through the moving belt.

From the chamber 2, the collected layer 7 is transferred to a drying chamber 11, by means of the moving belt 8, in which chamber 11, layer 7 is subjected to further drying by means of a hot drying gas, introduced in chamber 11 through a conduit 12 and withdrawn by suction through a plenum 13, located below chamber 11. In plenum 13 a further perforated plate 14 is located below moving belt 8, in the immediate vicinity thereof. By means of this perforated plate 14, the pressure difference over the assembly of moving belt 8 and perforated plate 14 is increased, whereby the risk of any areas of reduced thickness or density in the product layer 7 becoming heat-damaged due to over-drying is substantially reduced. From drying chamber 11, the product layer 7 is transferred to a cooling chamber 15 by means of moving belt 8, in which chamber 15 it is brought into contact with dehumidified, cooled air, supplied through conduit 16 and withdrawn through plenum 17, located below moving belt 7, beneath chamber 15. After cooling, the product leaves chamber 15 and moving belt 7 as shown schematically to the right in the drawing.

FIG. 2 shows an embodiment, deviating from the embodiment shown in FIG. 1 in the perforated plate 9 located below the moving belt 8 at the place, where it enters chamber 2, having been substituted by a restriction member 19, comprising a number of perforated plates being located below moving belt 8, in the immediate vicinity thereof, which together cover the bottom area of spray drying chamber 2. Furthermore, openings 26 in the ceiling of the chamber 2 are provided for the introduction of supplementary drying gas, supplied through conduit 25, inter alia with the purpose of reducing deposits on the ceiling. In other respects, the embodiment shown in FIG. 2 corresponds to that shown in FIG. 1.

In the above, the invention has been explained by means of various specific embodiments thereof, however, it will be appreciated, that various modifications and alterations can be made by a person skilled in the art, without deviating from the spirit and scope of the invention.

What is claimed is:

1. A process, wherein partially dried or congealed particles are collected on a movable surface of a screen means, thereby forming a product layer on said movable surface, which layer is dried or cooled in one or more stages by passing drying or cooling gas through said product layer and said screen means, a pressure difference being applied over the screen means and the product layer, and the movable surface being moved, characterized in the pressure difference over the screen means being such in at least one section of at least one drying and cooling stage of the process, that the ratio between the pressure difference over the screen means and the pressure difference over the product layer, when collected, is at least 1.5.

2. A process according to claim 1, wherein the pressure difference over the screen means varies across the movable surface in a direction being transversal to the direction of movement of said surface.

3. A process according to claim 1, wherein the pressure difference over the screen means varies across the movable surface in the direction of movement of said surface.

4. A process according to claim 1, wherein said ratio is in a particle collection stage.

5. A process according to claim 1, wherein said ratio is a stage being an after-treatment stage carried out outside a particle collection stage.

6. A process according to claim 1, wherein said ratio is in the range from about 2.5 to about 15.

7. A process according to claim 1, wherein the pressure difference over the screen means is partially provided by a screen member, and partially by a restriction member being located in the immediate vicinity of the screen member on the side of the screen member being opposite to the product layer.

8. A process according to claim 7, wherein the ratio between the pressure difference over the screen member and the pressure difference over the restriction member is in the range from about 0.025 to about 2.

9. A process according to claim 1, wherein the pressure difference over the screen means is mainly provided by a screen member.

10. A process according to claim 7, wherein the screen member is a gas permeable conveyor belt.

11. A process according to claim 1, wherein the pressure difference over the screen means is mainly provided by a restriction member.

12. A process according to claim 7, wherein the restriction member is stationary.

13. A process according to claim 7, wherein the restriction of the restriction member is adjustable.

14. A process according to claim 7, wherein the restriction member comprises a perforated plate.

15. A process according to claim 1, wherein the movable surface is provided by a curved surface of a rotary drum.

16. An apparatus comprising:
one of a spray drying and spray cooling chamber (2);
means (4) for atomizing a feed stream into said spray drying and spray cooling chamber;
means (6,26) for bringing one of a drying and cooling gas into contact with said atomized feed steam in said chamber so as to provide one of partially dried and congealed particles;
screen means (8, 9, 14, 19) having a movable surface for collecting said one partially dried and congealed particles so as to form a product layer (7);
means for drawing one of drying and cooling gas through said product layer and said screen means in one or more drying and cooling stages (2, 11, 15), a pressure difference thereby being applied over the screen means and the product layer; and
means for moving said movable surface, wherein the screen means (8, 9, 14, 19) provides a pressure difference whereby in at least one section of at least one of said one or more drying and cooling stages (2, 11, 15), the ratio between the pressure difference over the screen means and the pressure difference over the product layer (7), when collected, is at least 1.5.

17. An apparatus according to claim 16, wherein the screen means provides said pressure difference over said screen means, which varies across the movable surface in a direction being transversal to the direction of movement of said surface.

18. An apparatus according to claim 16, wherein the screen means provides said pressure difference over said screen means, which varies across the movable surface in the direction of movement of said surface.

19. An apparatus according to claim 16, wherein the screen means provides said ratio is in the particle collection stage.

20. An apparatus according to claim 16, wherein the screen means provides said ratio is in a stage being an after-treatment stage carried out outside a particle collection stage.

21. An apparatus according to claim 16, wherein said ratio is in the range from about 2.5 to about 15.

22. An apparatus according to claim 16, wherein the pressure difference over the screen means is provided by a screen member (8) and by a restriction member (9, 14, 19) being located in the immediate vicinity of the screen member on the side of the screen member being opposite to the product layer.

23. An apparatus according to claim 22, wherein the screen member and the restriction member are adapted to provide a ratio between the pressure difference over the screen member and the pressure difference over the restriction member in the range from about 0.025 to about 2.

24. An apparatus according to claim 16, wherein the pressure difference over the screen means is mainly provided by a screen member.

25. An apparatus according to claim 22, wherein the screen member is a gas permeable conveyor belt.

26. An apparatus according to claim 16, wherein the pressure difference over the screen means is mainly provided by a restriction member.

27. An apparatus according to claim 22, wherein the restriction member is stationary.

28. An apparatus according to claim 22, wherein the restriction of the restriction member is adjustable.

29. An apparatus according to claim 22, wherein the restriction member comprises a perforated plate.

30. An apparatus according to claim 16, wherein the movable surface is provided by a curved surface of a rotary drum.

31. The process according to claim 1, wherein said ratio is in the range of about 1.5 to about 30.

32. The process according to claim 1, wherein said ratio is in the range from about 2 to about 20.

33. A process according to claim 9, wherein the screen member is a gas permeable conveyor belt.

34. A process according to claim 11, wherein the restriction member is stationary.

35. A process according to claim 11, wherein the restriction of the restriction member is adjustable.

36. A process according to claim 11, wherein the restriction member comprises a perforated plate.

37. An apparatus according to claim 24, wherein the screen member is a gas permeable conveyor belt.

38. An apparatus according to claim 26, wherein the restriction member is stationary.

39. An apparatus according to claim 26, wherein the restriction of the restriction member is adjustable.

40. An apparatus according to claim 26, wherein the restriction member comprises a perforated plate.

41. A process according to claim 1, wherein said ratio is in the range from about 3 to about 10.

42. An apparatus according to claim 16, wherein said ratio is in the range from 1.5 to 30.

43. An apparatus according to claim 16, wherein said ratio is in the range from about 2 to about 20.

44. An apparatus according to claim 16, wherein said ratio is in the range from about 3 to about 10.

* * * * *